(12) United States Patent
Derbeko et al.

(10) Patent No.: US 9,430,167 B1
(45) Date of Patent: Aug. 30, 2016

(54) SEQUENTIAL READ REQUEST MANAGEMENT IN DATA STORAGE SYSTEM ENVIRONMENT

(71) Applicant: EMC Corporation, Hopkinton, MA (US)

(72) Inventors: Philip Derbeko, Modiin (IL); Arieh Don, Newton, MA (US); Gabriel Benhanokh, Tel-Aviv (IL); Anat Eyal, Tel-Aviv (IL); Marik Marshak, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 252 days.

(21) Appl. No.: 13/908,083

(22) Filed: Jun. 3, 2013

(51) Int. Cl.
*G06F 12/00* (2006.01)
*G06F 3/06* (2006.01)

(52) U.S. Cl.
CPC ........... *G06F 3/0689* (2013.01); *G06F 3/0619* (2013.01); *G06F 3/0665* (2013.01)

(58) Field of Classification Search
CPC .............. G06F 3/0689; G06F 3/0653; G06F 2212/225; G06F 12/0868; G06F 3/0665; G06F 3/0619; G06F 12/0862; G06F 2212/602; G06F 2212/6024
USPC .................................................. 711/114, 137
See application file for complete search history.

(56) References Cited

U.S. PATENT DOCUMENTS

| | | | |
|---|---|---|---|
| 7,493,450 B2 * | 2/2009 | Bearden | G06F 12/0862 711/113 |
| 2013/0042066 A1 * | 2/2013 | Price | 711/119 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Jasmine Song
(74) *Attorney, Agent, or Firm* — Ryan, Mason & Lewis, LLP

(57) ABSTRACT

A host-based memory is maintained for a host computing device. Data obtained from a storage array in response to one or more read requests is stored in the host-based memory. The storage array includes an array-based memory and is configured to perform one or more data pre-fetch operations. The host computing device monitors for the occurrence of a set of sequential read requests. The set of sequential read requests is sent from the host computing device to the storage array when one or more read requests of the set of sequential read requests match data stored in the host-based memory. Thus, the storage array is enabled to perform one or more data pre-fetch operations in accordance with the array-based memory and the set of sequential read requests.

20 Claims, 3 Drawing Sheets

SEQUENTIAL READ REQUEST MANAGEMENT IN DATA STORAGE SYSTEM ENVIRONMENT

FIELD

The field relates generally to data storage system environments, and more particularly to techniques for increasing processing performance of sequential read requests in a data storage system environment.

BACKGROUND

A data storage system such as a Storage Area Network or SAN is composed of a set of physical storage devices (e.g., physical storage drives) that are grouped together into storage arrays, wherein each storage array is called a Redundant Array of Independent Disks (RAID). From a RAID group, portions of the storage array are allocated to a host computing device (host) to provide storage functions for operations or calculations being performed by the host. At least one host and at least one storage array may be considered to comprise a data storage system environment.

A given host issues data read commands and/or data write commands to a given storage array in the form of input/output (I/O) requests. In most storage array implementations, it is known to utilize an array cache to manage data associated with incoming write commands as well as to store data accessed from the storage array in response to previous read commands. In this way, the storage array does not need to access the storage drives to obtain data that has already been read and stored in the array cache. Receiving a request for data that has already been read and stored in the array cache is referred to as a "read hit." Thus, by managing read hits, the array cache improves the read request processing performance of the data storage system environment.

Some implementations of data storage system environments go further and include a cache in the host. In some cases, the host cache is realized using one or more flash memory devices. Effectively, the flash memory serves a similar function as the array cache, i.e., the flash memory stores data previously requested from the storage array. When there is a read hit in the flash memory, the flash memory provides the requested data rather than retrieving it from the storage array. Again, the host-based flash memory improves the read request processing performance of the data storage system environment.

However, there are cases where this host-based flash memory usage might cause degradation in the read request processing performance of the data storage system environment. Accordingly, in at least such cases, a need exists for improving read request processing performance in the data storage system environment.

SUMMARY

Embodiments of the invention provide techniques for improving read request processing performance in a data storage system environment, in particular, by increasing processing performance of sequential read requests in such a data storage system environment.

For example, in one embodiment, a method comprises the following steps. A host-based memory is maintained for a host computing device. Data obtained from a storage array in response to one or more read requests is stored in the host-based memory. The storage array comprises an array-based memory and is configured to perform one or more data pre-fetch operations. The host computing device monitors for the occurrence of a set of sequential read requests. The set of sequential read requests is sent from the host computing device to the storage array when one or more read requests of the set of sequential read requests match data stored in the host-based memory. Thus, the storage array is enabled to perform one or more data pre-fetch operations in accordance with the array-based memory and the set of sequential read requests.

In another embodiment, a method comprises the following steps. An array-based memory is maintained for a storage array. Data stored in the array-based memory comprises data obtained by the storage array in response to one or more read requests sent from a host computing device. The host computing device comprises a host-based memory. The storage array receives a set of sequential read requests from the host computing device when one or more read requests of the set of sequential read requests match data stored in the host-based memory. One or more data pre-fetch operations are performed in accordance with the array-based memory and the set of sequential read requests.

In yet another embodiment, a computer program product is provided which comprises a processor-readable storage medium having encoded therein executable code of one or more software programs. The one or more software programs when executed by a processor implement the steps of at least one of the above-described method.

In a further embodiment, an apparatus comprises a memory and a processor operatively coupled to the memory and configured to perform the steps of at least one of the above-described method.

Advantageously, embodiments described herein provide techniques for increasing processing performance of sequential read requests in a data storage system environment. For example, the host computing device is configured to monitor I/O requests and recognize sequential read requests such that, even if the host-based cache obtains a read hit, the storage array is informed of all of the read requests and thus can pre-fetch data from its storage devices.

These and other features and advantages of the present invention will become more readily apparent from the accompanying drawings and the following detailed description.

DETAILED DESCRIPTION

Embodiments of the present invention will be described herein with reference to exemplary computing systems, data storage systems, and associated servers, computers, storage devices and other processing devices. It is to be appreciated, however, that embodiments of the invention are not restricted to use with the particular illustrative system and device configurations shown. Moreover, the phrases "computing system," "processing platform," "data storage system," and "data storage system environment" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. However, a given embodiment may more generally comprise any arrangement of one or more processing devices.

As mentioned above, with regard to existing data storage system environments, there are cases where host-based flash memory usage might cause degradation in the read request processing performance. It is realized here that problematic cases include, but are not limited to, scenarios when applications executing on the host perform a sequential read (i.e., sequential read commands for consecutive blocks of data in the storage array) and the host-based flash memory contains some portion of the requested data. Typically, a storage array is programmed to recognize sequential read requests such that, after receiving sequential requests for some given number of data blocks, the storage array pre-fetches (goes out to the physical storage drives and obtains) data for some given number of subsequent consecutive data blocks. However, when host-based flash memory is used and thus may be serving some of the sequential read requests, this breaks the sequence of read requests that the storage array receives. As such, in these scenarios, the storage array stops performing (or never performs) a pre-fetch operation. Thus, once the application seeks to access data that is not in the host-based flash memory, the latency is much higher than it would be with a pre-fetch operation.

Embodiments described herein address these and other problematic cases associated with data storage system environments that comprise both host-based and array caches.

Figure 1:
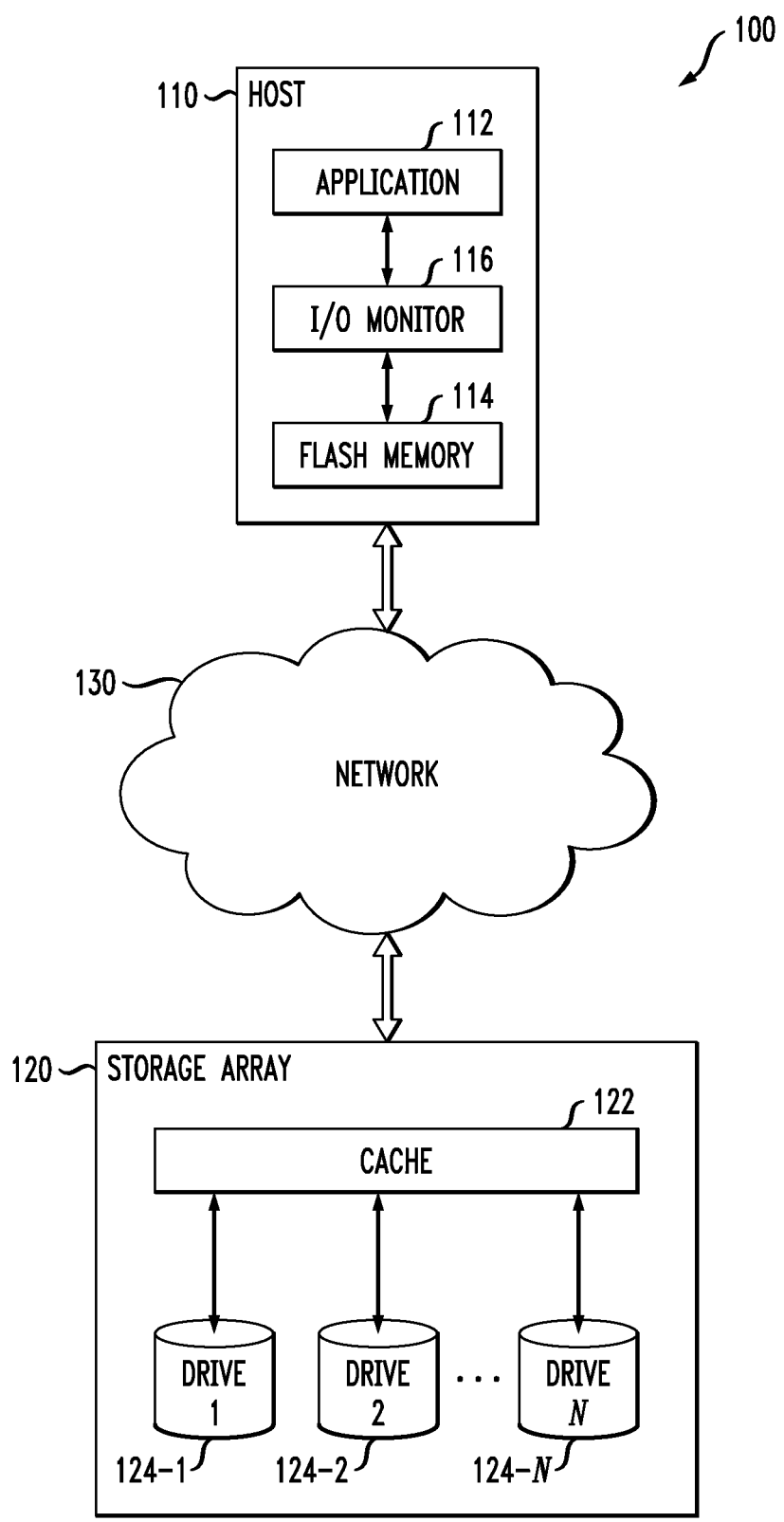
FIG. 1 shows a data storage system environment with a host computing device and a storage array according to an embodiment of the invention.

FIG. 1 shows a data storage system environment with a host computing device and a storage array according to an embodiment of the invention. As shown in data storage system environment 100 in FIG. 1, a host computing device (host) 110 is operatively coupled to a storage array 120 (wherein the storage array represents a part of or an entire data storage system) via a network 130. Network 130 may be any known communication network or combination of networks including networks using protocols such as, but not limited to, Ethernet, Internet Small Computer System Interface (iSCSI), Fibre Channel (FC), etc. Embodiments of the invention are not limited to any specific communication network or protocol. It is to be understood that while data storage system environment 100 shows a single host and a single storage array, embodiments of the invention are not so limited and, thus, methodologies of the invention can be implemented in environments with more hosts and/or more storage arrays.

The storage array 120, as shown, comprises an array cache 122 and a plurality of physical storage devices 124-1 through 124-N. By way of example only, the storage array 120 may comprise one or more storage products such as VNX and Symmetrix VMAX, both commercially available from EMC Corporation of Hopkinton, Mass. A variety of other storage products may be utilized to implement at least a portion of the storage array 120. The array cache 122 manages incoming read and write requests (commands) from the host 110, and stores data already read from the physical storage devices 124-1 through 124-N in case the data is requested again (i.e., a read hit). The plurality of physical storage devices 124-1 through 124-N are the back-end storage spindles (disks) that store the data passed to/from the host 110.

The host 110 is typically a server (e.g., a Windows server, a Sun Solaris server, an HP server, etc.) upon which an application 112 executes. In one example, the application 112 comprises a customer database (DB). However, in other embodiments, neither the host type nor the application type is limited to these particular examples. In addition, the host 110 comprises a flash memory 114 which operates as a host-based cache. It is to be understood, however, that the host-based cache 114 does not have to be implemented using flash memory technology. The flash memory 114 saves data written to and read from the storage array 120. Typically, the flash memory 114 is configured with more memory capacity than the array cache 122. In this way, the flash memory 114 can store more data and thus increase the percentage of read hits on the host side. This increase in read hits thus makes the overall read performance of the data storage system environment faster.

In general, it is desirable for the host-based cache (flash memory 114) to serve as many read requests as possible to reduce average response time. In addition, the more requests that are served from the host-based cache, the less busy the storage array is, and thus free to serve other clients (hosts). Furthermore, read requests for data that is served out of the host-based cache are typically processed much faster than read requests coming from the storage array, even if the requested data was in the array cache (array-side read hit). For example, assume the application 112 needs data, issues a read request, and the data is found in the flash memory 114 (host-based memory read hit). It is typical for this type of read request to be serviced in about 100 microseconds. In comparison, assume the application 112 needs data, issues a read request and the read request is sent to the storage array 120 and serviced out of the array cache 122. It is typical for this type of read request to be serviced in about 1000 to 2000 microseconds.

However as mentioned above, in an existing data storage system environment, a problem arises when the application seeks to perform a sequential read and the host-based cache has some part of the requested data stored therein. In this case, the use of the host-based cache breaks up the sequence of read requests for the storage array, causing the storage array to stop doing (or never do) pre-fetch operations. Thus, once the application attempts to access data that is not in the host-based cache, the latency to serve that data will be much higher than it would be with a pre-fetch operation. An example of this problem will now be given.

Assume a database application executing on a host issues a set of sequential read requests for consecutive data blocks as follows: (read1): 0-100; (read2): 101-200; (read3): 201-300; (read4): 301-400; (read5): 401-500. Assume further that the host-based cache does not contain any of these data blocks (no read hits), and thus the set of sequential read requests are sent to the storage array. The storage array, after receiving read1 and read2, one after the other, will assume read3, read4, and read5 will be coming and will pre-fetch, from the physical storage devices, the consecutive data blocks following the data blocks associated with read1 and read2. This pre-fetch operation provides for significant processing performance improvement. Physical storage device accesses are about 10-20 milliseconds in duration, and at times, even longer. However, reading additional data from the physical storage devices while reading some other data does not take much longer. So, if the storage array pre-fetches the data for read3, read4, and read5, it will cost (in terms of performance) slightly more than read2. But if no pre-fetch is performed, then read3, read4, and read5 will take three times longer than read2.

However, assume now that host-based cache has the data to service read2 and read4. Then, in the existing data storage system environment, read1, read3 and read 5 will be sent to the storage array, while read2 and read4 will be serviced out of the host-based cache and thus not be sent to the storage array. As such, because the host-based cache is servicing read2 and read4, the storage array will not be able to detect the sequence of read requests, not perform a pre-fetch, and thus cause a lower read processing performance.

Accordingly, to overcome at least the above-mentioned sequential read request problem, embodiments of the invention introduce an I/O monitor 116 into the host 110. As will be explained in further detail below in the context of FIG. 2, I/O monitor 116 monitors read I/O requests and recognizes sequential reads. When a set of sequential reads is recognized, the I/O monitor 116 instructs the host 110 to send all the requests of the set to the storage array 120, even if the flash memory 114 obtains a read hit for one or more of the read requests in the set, and thus the storage array 120 can pre-fetch data from storage devices 124-1 through 124-N and store the pre-fetched data in array cache 122.

Figure 2:
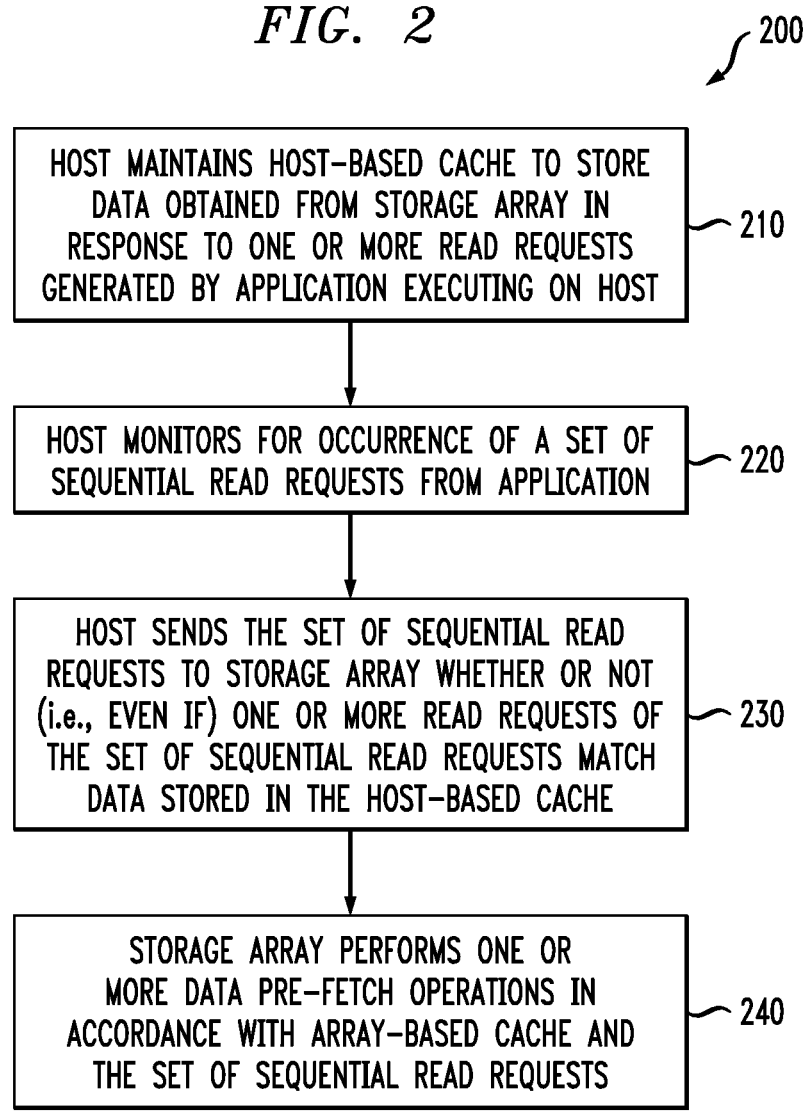
FIG. 2 shows a methodology for increasing processing performance of sequential read requests in a data storage system environment according to an embodiment of the invention.

FIG. 2 shows a methodology 200 for increasing processing performance of sequential read requests in a data storage system environment according to an embodiment of the invention. For example, it is assumed that the methodology 200 is performed in accordance with the data storage system environment 100 of FIG. 1. However, the methodology can be performed with other data storage systems environments.

In step 210, a host (e.g., host 110) maintains a host-based cache (e.g., flash memory 114) to store data obtained from a storage array (e.g., storage array 120) in response to one or more read requests generated by an application (e.g., application 112) executing on the host.

In step 220, the host monitors for occurrence of a set of sequential read requests from application. For example, in the FIG. 1 embodiment, the monitoring is performed by the I/O monitor 116.

In step 230, the host sends the set of sequential read requests to the storage array whether or not (i.e., even if) one or more read requests of the set of sequential read requests match data stored in the host-based cache.

In step 240, the storage array performs one or more data pre-fetch operations in accordance with an array-based cache (e.g., array cache 122) and the set of sequential read requests.

Thus, if the data for a given request in a set of sequential read requests generated by any data requestor (e.g., an application) is not present in the host-based cache, then the request is sent to the storage array anyway. But, advantageously, if the data for a given request in a set of sequential read requests is present in the host-based cache, then the request is served from the host-based cache (i.e., the host-based cache provides the requested data to the data requestor) and the read request (or a pre-fetch request from the SCSI standard) is sent to the storage array in parallel. The answer to this request (i.e., the data returned to the host by the storage array) is not used by the host (i.e., the host-based cache already has the data) and is thus discarded. However, sending all the read requests of the set to the storage array enables the storage array to recognize sequential patterns.

In certain cases, the host-based cache and the storage array share a common communication protocol between them. In those cases, the host-based cache may send a map of I/O requests to the storage array to ensure that the sequence of read requests will not be broken. In some embodiments, the storage array does not return the data, but will continue pre-fetching the data not present in the array cache.

Figure 3:
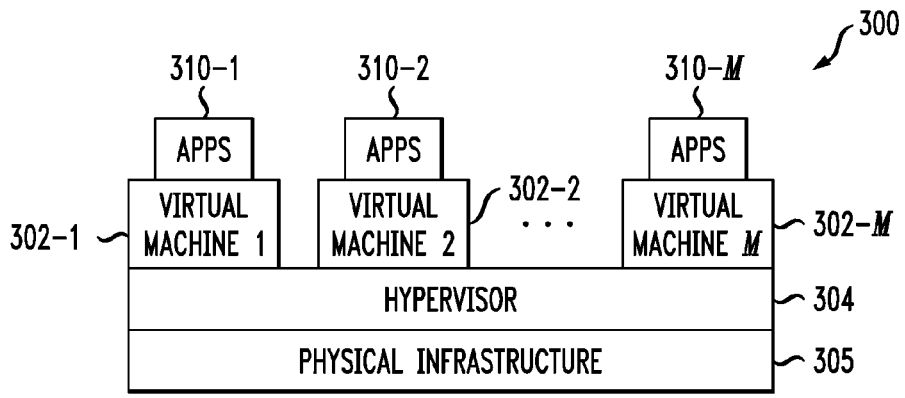
FIGS. 3 and 4 show examples of processing platforms utilized to implement a data storage system environment according to an embodiment of the invention.

It is to be appreciated that the various components and steps illustrated and described in FIGS. 1 and 2 can be implemented in a distributed virtual infrastructure or cloud infrastructure. FIG. 3 illustrates a cloud infrastructure 300. The data storage environment 100 of FIG. 1 can be implemneted, in whole or in part, by the cloud infrastructure 300.

As shown, the cloud infrastructure 300 comprises virtual machines (VMs) 302-1, 302-2, . . . , 302-M implemented using a hypervisor 304. The hypervisor 304 runs on physical infrastructure 305. The cloud infrastructure 300 further comprises sets of applications 310-1, 310-2, . . . , 310-M running on respective ones of the virtual machines 302-1, 302-2, . . . , 302-M (utilizing associated logical storage units or LUNs) under the control of the hypervisor 304.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Although only a single hypervisor 304 is shown in the example of FIG. 3, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 304 which, as shown in FIG. 3, is directly inserted on top of the computer hardware in order to allocate hardware resources of the physical computer (physical infrastructure 305) dynamically and transparently. The hypervisor 304 affords the ability for multiple operating systems to run concurrently on a single physical computer and share hardware resources with each other.

An example of a commercially available hypervisor platform that may be used to implement portions of the cloud infrastructure 300 in one or more embodiments of the invention is vSphere which may have an associated virtual infrastructure management system such as vCenter, both commercially available from VMware Inc. of Palo Alto, Calif. The underlying physical infrastructure 305 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 300.

Figure 4:
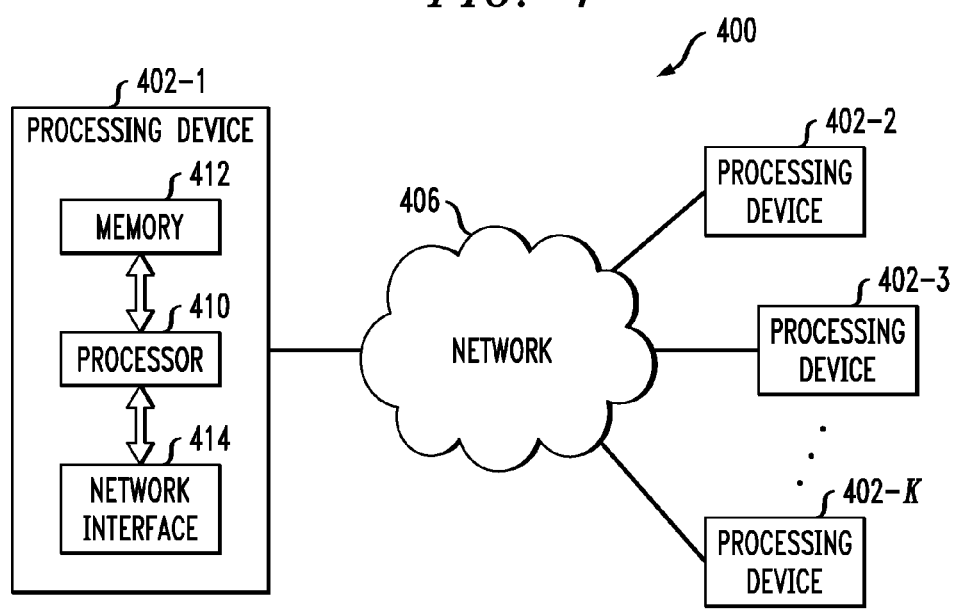

An example of a processing platform on which the cloud infrastructure 300 may be implemented is processing platform 400 shown in FIG. 4. The processing platform 400 in this embodiment comprises a plurality of processing devices denoted 402-1, 402-2, 402-3, . . . , 402-K which communicate with one another over a network 406. One or more of the components shown and described in FIGS. 1 through 3 may therefore each run on one or more storage arrays, one or more hosts, servers, computers or other processing platform elements, each of which may be viewed as an example of what is more generally referred to herein as a "processing device." As illustrated in FIG. 4, such a device generally comprises at least one processor and an associated memory, and implements one or more functional modules for controlling certain features of components shown in FIGS. 1 through 3. Again, multiple elements or modules may be implemented by a single processing device in a given embodiment.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. The memory 412 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the processing device 402-1 causes the device to perform functions associated with one or more of the components shown in FIGS. 1 through 3. One skilled in the art would be readily able to implement such software given the teachings provided herein. Other examples of computer program products embodying embodiments of the invention may include, for example, optical or magnetic disks.

Also included in the processing device 402-1 is network interface circuitry 414, which is used to interface the processing device with the network 406 and other system components. Such circuitry may comprise conventional transceivers of a type well known in the art.

The other processing devices 402 of the processing platform 400 are assumed to be configured in a manner similar to that shown for processing device 402-1 in the figure.

The processing platform 400 shown in FIG. 4 may comprise additional known components such as batch processing systems, parallel processing systems, physical machines, virtual machines, virtual switches, storage volumes, logical units, etc. Again, the particular processing platform shown in FIG. 4 is presented by way of example only, and components and steps shown and described in FIGS. 1 through 3 may include additional or alternative processing platforms, as well as numerous distinct processing platforms in any combination.

Also, numerous other arrangements of servers, computers, storage devices or other components are possible for implementing components shown and described in FIGS. 1 through 3. Such components can communicate with other components over any type of network, such as a wide area network (WAN), a local area network (LAN), a satellite network, a telephone or cable network, a storage network (e.g., Fibre Channel, iSCSI, Ethernet), a converged network (e.g., FCoE or Infiniband) or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   maintaining a host-based memory for a host computing device, wherein data obtained from a storage array in response to one or more read requests is stored in the host-based memory, the storage array comprising an array-based memory and configured to perform one or more data pre-fetch operations;
   monitoring at the host computing device for the occurrence of a set of sequential read requests, wherein the set of sequential read requests comprises two or more sequential read requests; and
   sending the two or more sequential read requests of the set from the host computing device together to the storage array even when one or more read requests of the set of sequential read requests match data stored in the host-based memory, such that the storage array is enabled to perform one or more data pre-fetch operations and to store pre-fetched data in the array-based memory responsive to the set of sequential read requests.

2. The method of claim 1, further comprising the host computing device checking the host-based memory for data that matches one or more read requests of the set of sequential read requests.

3. The method of claim 2, further comprising the host computing device providing the data from the host-based memory that matches the one or more read requests of the set of sequential read requests to at least one data requestor.

4. The method of claim 3, wherein the at least one data requestor comprises an application executing on the host computing device.

5. The method of claim 3, further comprising the host computing device receiving data from the storage array, wherein the received data comprises data that matches one or more read requests of the set of sequential read requests.

6. The method of claim 5, further comprising the host computing device discarding the received data from the storage array.

7. The method of claim 1, wherein the host-based memory comprises a host-based cache.

8. The method of claim 7, wherein the host-based cache comprises a flash memory.

9. The method of claim 1, wherein the array-based memory comprises an array-based cache.

10. A computer program product comprising a processor-readable storage medium having encoded therein executable code of one or more software programs, wherein the one or more software programs when executed by a processor implement the steps of:
    maintaining a host-based memory for a host computing device, wherein data obtained from a storage array in response to one or more read requests is stored in the host-based memory, the storage array comprising an array-based memory and configured to perform one or more data pre-fetch operations;

monitoring at the host computing device for the occurrence of a set of sequential read requests, wherein the set of sequential read requests comprises two or more sequential read requests; and sending the two or more sequential read requests of the set from the host computing device together to the storage array even when one or more read requests of the set of sequential read requests match data stored in the host-based memory, such that the storage array is enabled to perform one or more data pre-fetch operations and to store pre-fetched data in the array-based memory responsive to the set of sequential read requests.

11. A method, comprising:

maintaining an array-based memory for a storage array, wherein data stored in the array-based memory comprises data obtained by the storage array in response to one or more read requests sent from a host computing device, the host computing device comprising a host-based memory;

receiving at the storage array a set of sequential read requests from the host computing device even when one or more read requests of the set of sequential read requests match data stored in the host-based memory, wherein the set of sequential read requests comprises two or more sequential read requests sent together from the host computing device to the storage array; and performing one or more data pre-fetch operations and storing pre-fetched data in the array-based memory responsive to the set of sequential read requests.

12. The method of claim 11, further comprising the storage array sending data to the host computing device, wherein the sent data comprises data that matches one or more read requests of the set of sequential read requests.

13. The method of claim 11, wherein the host-based memory comprises a host-based cache.

14. The method of claim 13, wherein the host-based cache comprises a flash memory.

15. The method of claim 11, wherein the array-based memory comprises an array-based cache.

16. A computer program product comprising a processor-readable storage medium having encoded therein executable code of one or more software programs, wherein the one or more software programs when executed by a processor implement the steps of:

maintaining an array-based memory for a storage array, wherein data stored in the array-based memory comprises data obtained by the storage array in response to one or more read requests sent from a host computing device, the host computing device comprising a host-based memory;

receiving at the storage array a set of sequential read requests from the host computing device even when one or more read requests of the set of sequential read requests match data stored in the host-based memory, wherein the set of sequential read requests comprises two or more sequential read requests sent together from the host computing device to the storage array; and performing one or more data pre-fetch operations and storing pre-fetched data in the array-based memory responsive to the set of sequential read requests.

17. An apparatus, comprising:

a memory; and a processor operatively coupled to the memory to form at least a part of a host and configured to:

maintain a host-based cache, wherein data obtained from a storage array in response to one or more read requests generated by an application executing on the host is stored in the host-based cache, the storage array comprising an array-based cache and configured to perform one or more data pre-fetch operations in accordance with the array-based cache;

monitor for the occurrence of a set of sequential read requests from the application, wherein the set of sequential read requests comprises two or more sequential read requests; and send the two or more sequential read requests of the set from the host computing device together to the storage array even when one or more read requests of the set of sequential read requests match data stored in the host-based memory, such that the storage array is enabled to perform one or more data pre-fetch operations and to store pre-fetched data in the array-based memory responsive to the set of sequential read requests.

18. The apparatus of claim 17, wherein the processor is further configured to provide data from the host-based memory that matches the one or more read requests of the set of sequential read requests to at least one data requestor.

19. An apparatus, comprising:

a memory; and a processor operatively coupled to the memory to form at least a part of a storage array and configured to:

maintain an array-based cache, wherein data stored in the array-based cache comprises data obtained by the storage array in response to one or more read requests sent from a host computing device, the host computing device comprising a host-based cache;

receive at the storage array a set of sequential read requests from the host computing device even when one or more read requests of the set of sequential read requests match data stored in the host-based memory, wherein the set of sequential read requests comprises two or more sequential read requests sent together from the host computing device to the storage array; and perform one or more data pre-fetch operations and store pre-fetched data in the array-based memory responsive to the set of sequential read requests.

20. The apparatus of claim 19, wherein the storage array is part of a data storage system.

* * * * *